US007638971B2

(12) United States Patent
Guccione et al.

(10) Patent No.: US 7,638,971 B2
(45) Date of Patent: Dec. 29, 2009

(54) MULTIPLE DEVICE BATTERY CHARGER

(75) Inventors: Darren Guccione, Chicago, IL (US); Craig Lurey, El Dorado Hills, CA (US)

(73) Assignee: Callpod, Inc., Chicago, IL (US)

( * ) Notice: Subject to any disclaimer, the term of this patent is extended or adjusted under 35 U.S.C. 154(b) by 0 days.

(21) Appl. No.: 11/726,533

(22) Filed: Mar. 22, 2007

(65) Prior Publication Data

US 2008/0231113 A1 Sep. 25, 2008

(51) Int. Cl.
*H02J 7/00* (2006.01)

(52) U.S. Cl. ........................ 320/114; 320/107; 320/112

(58) Field of Classification Search ................. 320/116, 320/119, 114, 160
See application file for complete search history.

(56) References Cited

U.S. PATENT DOCUMENTS 5,587,645 A * 12/1996 Sciammarella et al. ...... 362/253
5,744,939 A * 4/1998 Leppo ........................ 320/153
6,225,708 B1 * 5/2001 Furukawa et al. ............. 307/66
6,922,039 B2 * 7/2005 King .......................... 320/133
2004/0085043 A1 * 5/2004 Germagian et al. ......... 320/107
2005/0285562 A1 * 12/2005 Wu ............................ 320/111

* cited by examiner

*Primary Examiner*—Patrick J Assouad
*Assistant Examiner*—Samuel Berhanu
(74) *Attorney, Agent, or Firm*—McCracken & Frank LLP

(57) ABSTRACT

An improved method of charging multiple batteries and battery powered devices of different types at one time. Utilizing multiple methods of supplying DC power to external batteries, a user can charge a variety of devices at the same time. The power is routed in three distinct ways: directly to the output ports, through resistors, and through a switch converter. Then, using methods established and known to one in the art, external electronic devices may be attached to the output ports. Thus, the external battery will be charged through whichever route delivers the proper voltage. This design utilizes the logic contained within the external device for charging purposes.

12 Claims, 2 Drawing Sheets

MULTIPLE DEVICE BATTERY CHARGER

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

This invention relates to the simultaneous charging of multiple batteries of small electronic devices.

PRIOR ART

People today use numerous small electronic devices which run on battery power, such as cell phones, personal music players, headsets, etc. These devices constantly need to be recharged to remain functional. Each device generally comes with its own power cord that can charge the product via a standard wall electrical outlet. However, this requires a person to keep track of a power cord for each device and limits the number of devices that one can recharge at a time to the number of conveniently available wall outlets. Therefore, it is beneficial to have a method or device to charge multiple devices from a single wall outlet while minimizing the number of power cords needed.

The prior methods to achieve these goals are inadequate. The basic, rudimentary method was to use a power strip to increase the number of plugs available. However, this was unsightly and did nothing to minimize the number of cords necessary.

Another example of the prior art is U.S. Pat. No. 6,828,759 (Xiong, Ramsden, and Riley, issued Dec. 7, 2004), a circuit for regulating current to multiple batteries in a battery charger. This method relied on resistors to scale the current to each individual battery. The logic for charging the battery is contained in the charger. Additionally, this method will only work for one type of battery. It does not benefit a user who has multiple battery types to charge at once. Furthermore, other prior art, such as U.S. Pat. No. 7,151,358 (Yang, et al, issued Dec. 19, 2006), is not an efficient answer to the problem. It limits the types of batteries or devices that can be charged in a pre-determined manner. This method does not enable the user to charge all of her devices. The method is too limited.

Similar methods have been developed to charge multiple batteries of the same type. However, these methods look at the problem too narrowly and do not allow the user to charge multiple device by using a single charger. The prior art chargers fail to be truly universal.

SUMMARY

An example of the device will be contained in a base unit. A power cord will supply the device with current from a standard wall outlet or other source. Inside the base unit, the device is a circuit designed to direct the flow of electricity to a plurality of outputs in such a way as to allow various types of batteries used by electronic devices to be charged. For example, the current to one pin on the output will be the unmodified input power. Current flow through the resistors will result in providing required voltage at the output pin, using a different pin. Another, different, output pin provides regulated voltage sourced from the main input through the regulator circuitry. The end result is that each output port has the ability to charge to an electronic device, regardless of which pin carries the correct charge. This allows the user to charge a greater variety of devices with a single unit.

It is also possible to place indicators, such as LEDs or other things known to one of skill in the art, to illustrate that the device is working properly. By placing the indicator at various parts of the circuit, a user may know that the input power is reaching the device and/or leaving the device properly.

In accordance with one embodiment, a multiple battery charger comprises a power source cord, a circuit to route the power to a plurality of outputs in multiple ways, and a plurality of outputs designed to accept power converters as known in the art.

DRAWINGS

REFERENCE NUMBERS

100—Power Cord
102—Power Input Port
110A-F—Power Output Ports
120A-F—Converter Cords
130A-F—Electronic Devices
140—Base Unit
212—Power input
222—DC to DC Switching Regulator
232A-F—Power Outputs
242A-F—Resistors

DETAILED DESCRIPTION

Figure 1:
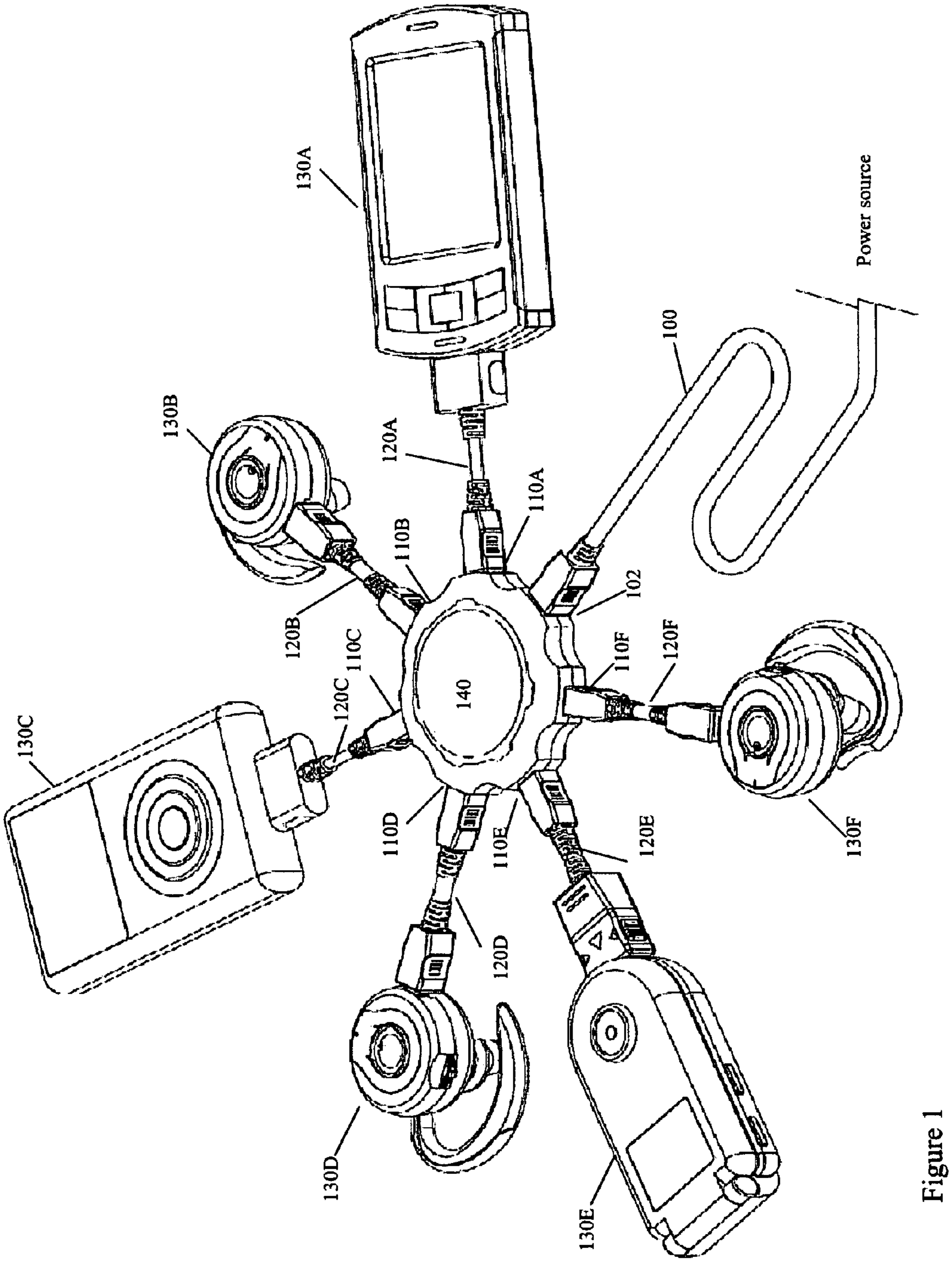
FIG. 1 shows a fully functioning unit from the outside.
Figure 2:
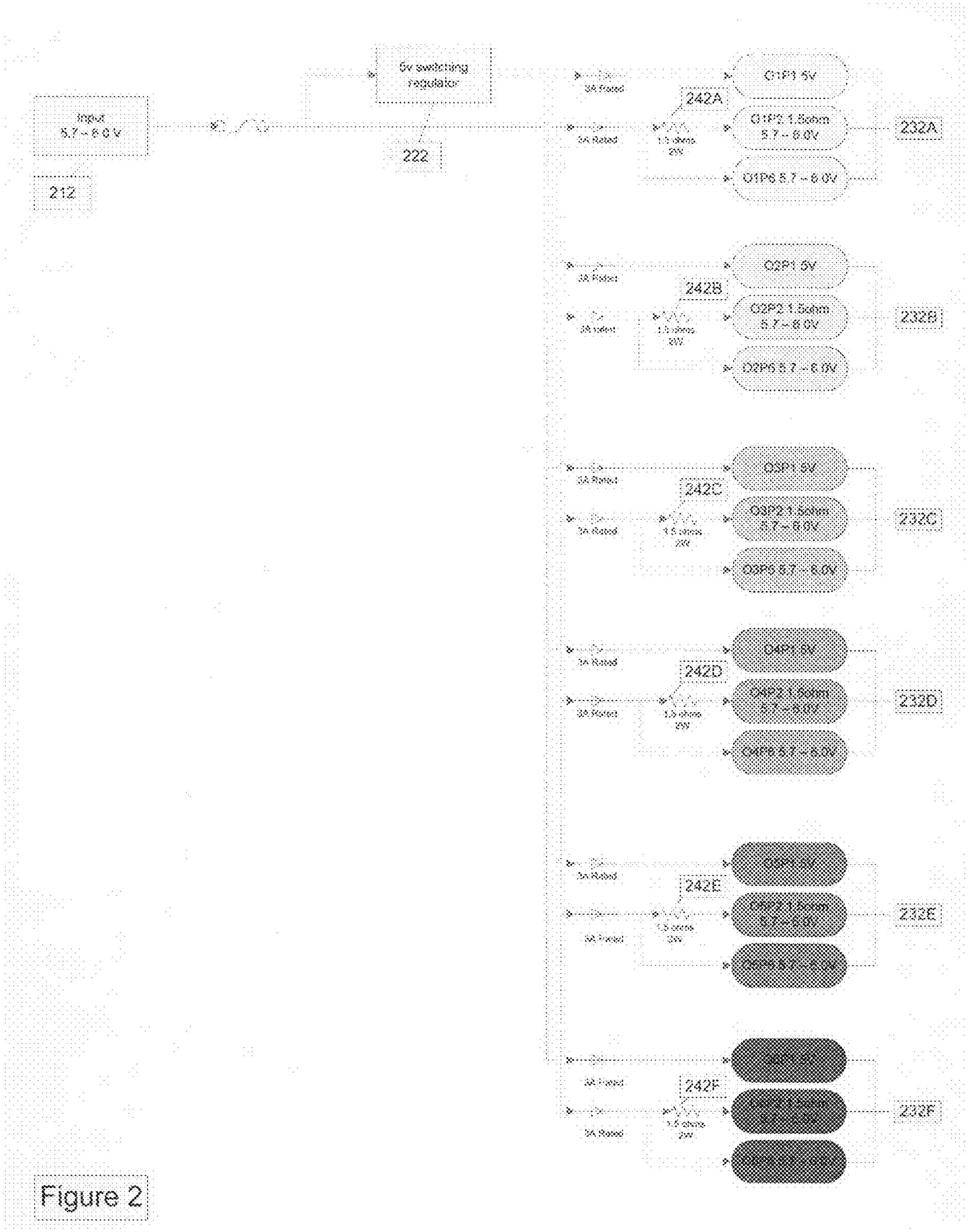
FIG. 2 shows a block diagram of the circuit.

One embodiment of the device is illustrated in FIG. 1 and FIG. 2. As seen in FIG. 1, a power cord 100 connects a power source to the base unit 140 via power input port 102. The base unit can be made of any material that allows it to supply a structure capable of containing the required parts. Small electronic devices 130A-F are then connected to the base unit 140 via output power ports 110A-F utilizing converter cords 120A-F as known in the art. This embodiment reveals six output power ports; however, one skilled in the art will be able to create a base unit and circuit for any plurality of output power ports.

An embodiment of the device, in circuit form, contained within the base unit 140 is shown in FIG. 2. Power comes in a female 5pin mini-USB connector 212 powered by an AC/DC adapter. The output is on the range of approximately 5.7 VDC to 6.0 VDC. This voltage is inputted to a down conversion switching regulator 222. Other methods may be used to reach similar results. The regulator down converts the inputted voltage to 5.0 VDC. This output is routed to Pin 1 of power outputs 232A-F.

The inputted power from connector 212 is also routed through two 3Ω power resistors 242A-F. This results in 1.5Ω of resistance. This is routed to Pin 2 of power outputs 232A-F. The inputted power from connector 212 is also routed directly to Pin 6 of outputs 232A-F.

By routing the inputted power three different ways, this embodiment does not limit itself to one type of battery. This method allows one device to charge devices such as cellular mobile phones made by Motorola, Nokia, Samsung, Sony-Ericsson, LG, Kyocra, Ipods, Bluetooth headsets of various manufacturers, standard USB based devices, and other similar products.

This embodiment is merely one way to practice the claimed invention. None of the specifics contained in this description should be construed to limit the scope of the embodiment, but as merely providing an illustration of an embodiment. The scope of the embodiment should be determined by the claims and their legal equivalents.

We claim:

1. A method of charging a plurality of small chargeable electronic devices, comprising the steps:

a. providing a base unit with a housing having an input port and a plurality of output ports disposed along an outer surface of the housing;

b. inputting a predetermined first direct current voltage into the base unit through a connector of the input port, c. routing the predetermined first input voltage directly to a first respective pin of each of the plurality of output ports, d. additionally routing the first predetermined input voltage through a DC to DC switching regulator that changes the first voltage to a second voltage different from the first voltage and routing the second voltage to a second respective pin of each of the plurality of output ports, and e. additionally routing the predetermined first input voltage through resistors to a third respective pin of each of the plurality of output ports, wherein the resistors providing the first predetermined voltage to the third pin of each of the plurality of output ports all have the same resistance, wherein each of the plurality of output ports is adapted to detachably connect to one of the plurality of small chargeable electronic devices and whereby, you may charge the plurality of electronic devices at the same time regardless of battery types.

2. The method of claim 1 further comprising an indicator upon detection of input voltage.

3. The method of claim 1 further comprising an indicator upon detection of voltage at each output port.

4. The method of claim 1 wherein the DC to DC switching regulator is a down conversion switching regulator.

5. An apparatus for charging a plurality of small chargeable electronic devices, comprising:

a. a base unit having a housing with an input port and a plurality of output ports disposed on an outer surface of the housing, b. the input port including an input connector disposed within the housing for coupling a first predetermined direct current voltage into the base unit, c. a route for the first predetermined input voltage directly to a first respective pin of each of the plurality of output ports on the outer surface of the base unit, d. an additional route for the first predetermined input voltage into a DC to DC switching regulator that changes the first voltage to a second voltage different from the first voltage and connects the second voltage to a second respective pin of each of the plurality of output ports, e. an additional route for the first predetermined input voltage through resistors to a third respective pin of each of the plurality of output ports, wherein the resistors providing the first predetermined voltage to the third pin of each of the plurality of output ports all have the same resistance, wherein each of the plurality of output ports is adapted to detachably connect to one of the plurality of small chargeable electronic devices and whereby the apparatus will charge a plurality of electronic devices at the same time regardless of battery types.

6. The apparatus of claim 5 further comprising an indicator upon detection of input voltage.

7. The apparatus of claim 5 further comprising an indicator upon detection of voltage at each output port.

8. The apparatus of claim 5 wherein the DC to DC switching regulator is a down conversion switching regulator.

9. An apparatus for charging a plurality of small chargeable electronic devices comprising a. a base unit having a housing with an input port and a plurality of output ports disposed on an outer surface of the housing, b. the input port having an input connector for coupling a first predetermined direct current voltage into a base unit, c. a means for routing the first predetermined input voltage directly to a first respective pin of each of the plurality of output ports on the housing of the base unit, d. a means for additionally routing the first predetermined input voltage into a DC to DC switching regulator for changing the first predetermined voltage to a second predetermined voltage different from the first predetermined voltage and for routing the second predetermined voltage to a second respective pin of each of the plurality of output ports, and e. a means for additionally routing the first predetermined input voltage through resistors to a third respective pin of each of the plurality of output ports, wherein the resistors providing the first predetermined voltage to the third pin of each of the plurality of output ports all have the same resistance, wherein each of the plurality of output ports is adapted to detachably connect to one of the plurality of small chargeable electronic devices and whereby the apparatus will charge a plurality of electronic devices at the same time regardless of battery types.

10. The apparatus of claim 9 further comprising an indicator upon detection of input voltage.

11. The apparatus of claim 9 further comprising an indicator upon detection of voltage at each output port.

12. The apparatus of claim 9 wherein the DC to DC switching regulator is a down conversion switching regulator.

* * * * *